United States Patent
Hallauer

(10) Patent No.: US 12,533,010 B2
(45) Date of Patent: Jan. 27, 2026

(54) HANDLE WITH A MECHANISM FOR CONTROLLING THE BENDING OF THE HEAD OF A MEDICAL ENDOSCOPE

(71) Applicant: AXESS VISION TECHNOLOGY, Joue-les-Tours (FR)

(72) Inventor: Emmanuel Hallauer, Sache (FR)

(73) Assignee: AXESS VISION TECHNOLOGY, Joue-les-Tours (FR)

( * ) Notice: Subject to any disclaimer, the term of this patent is extended or adjusted under 35 U.S.C. 154(b) by 353 days.

(21) Appl. No.: 17/793,064

(22) PCT Filed: Dec. 22, 2020

(86) PCT No.: PCT/FR2020/052593
§ 371 (c)(1),
(2) Date: Jul. 15, 2022

(87) PCT Pub. No.: WO2021/144513
PCT Pub. Date: Jul. 22, 2021

(65) Prior Publication Data
US 2023/0041660 A1 Feb. 9, 2023

(30) Foreign Application Priority Data
Jan. 17, 2020 (FR) .................................. 2000446

(51) Int. Cl.
*A61B 1/00* (2006.01)
*A61B 1/005* (2006.01)
(52) U.S. Cl.
CPC ...... *A61B 1/00066* (2013.01); *A61B 1/00121* (2013.01); *A61B 1/0052* (2013.01)
(58) Field of Classification Search
CPC ............ A61B 1/00066; A61B 1/00121; A61B 1/0052
See application file for complete search history.

(56) References Cited

U.S. PATENT DOCUMENTS

| 5,618,258 A | 4/1997 | Held |
| 6,017,322 A | 1/2000 | Snoke et al. |

(Continued)

FOREIGN PATENT DOCUMENTS

| DE | 102012012877 A | 1/2014 |
| FR | 3047887 A | 8/2017 |

(Continued)

OTHER PUBLICATIONS

English abstract of FR3047887.
English abstract of DE102012012877.

*Primary Examiner* — Michael J Carey
*Assistant Examiner* — Megan Elizabeth Monahan
(74) *Attorney, Agent, or Firm* — Oliff PLC

(57) ABSTRACT

The disclosure relates to a handle for a medical endoscope including a casing having two opposite main faces and provided with a mechanism for controlling the bending of a distal head of the medical endoscope, this control mechanism including at least one member for actuating a pivoting part made in the form of an actuation ring having an axial ferrule having a cylindrical outer surface cooperating with an annular bearing to be guided in rotation by this annular bearing, along a transverse axis of rotation and whose rotation causes the bending of the distal head, the axial ferrule having an internal bore partly delimiting a cylindrical opening which passes right through the casing by opening out through internal bores on the two opposite main faces of the casing, the pivoting part and the annular bearing being arranged to be located outside the cylindrical opening.

14 Claims, 4 Drawing Sheets

(56) References Cited

U.S. PATENT DOCUMENTS

| | | | |
|---|---|---|---|
| 6,673,012 B2 * | 1/2004 | Fujii | A61B 1/0052 600/101 |
| 11,064,869 B2 * | 7/2021 | McWeeney | A61B 1/018 |
| 11,166,627 B2 * | 11/2021 | Hansen | A61B 1/0057 |
| 2011/0118550 A1 * | 5/2011 | Tulley | A61B 1/0057 600/149 |
| 2012/0109186 A1 | 5/2012 | Parrott et al. | |
| 2012/0302835 A1 | 11/2012 | Mathieu et al. | |
| 2013/0324973 A1 * | 12/2013 | Reed | A61M 25/0097 604/528 |
| 2021/0212553 A1 * | 7/2021 | Appling | A61B 1/00128 |

FOREIGN PATENT DOCUMENTS

| | | | |
|---|---|---|---|
| WO | 2010066789 A1 | 6/2010 | |
| WO | 2011089349 A1 | 7/2011 | |

* cited by examiner

[Fig. 1]
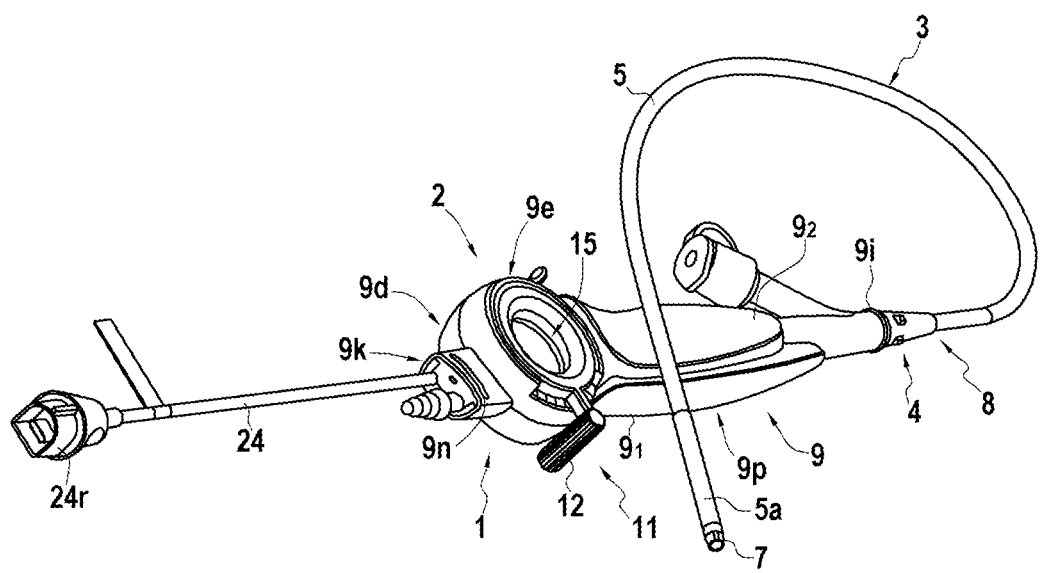
[Fig.2]
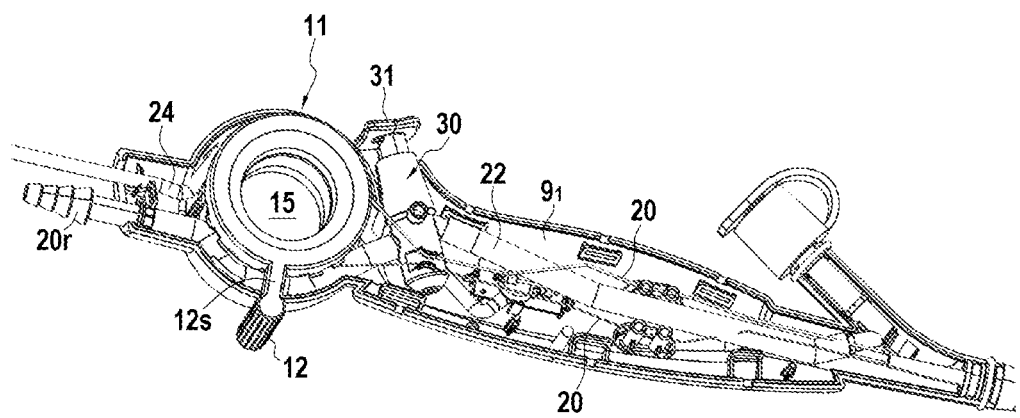

[Fig.3]
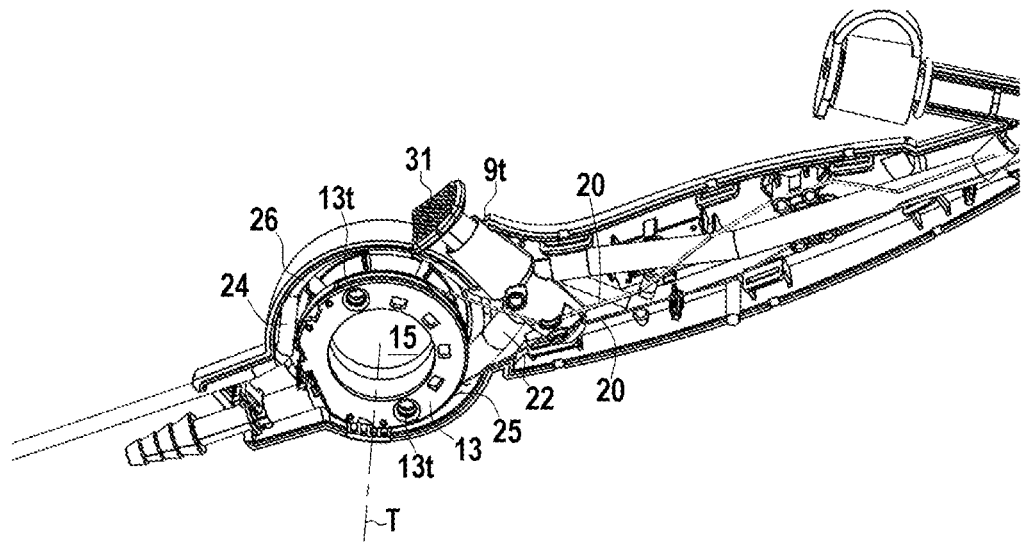
[Fig.4]
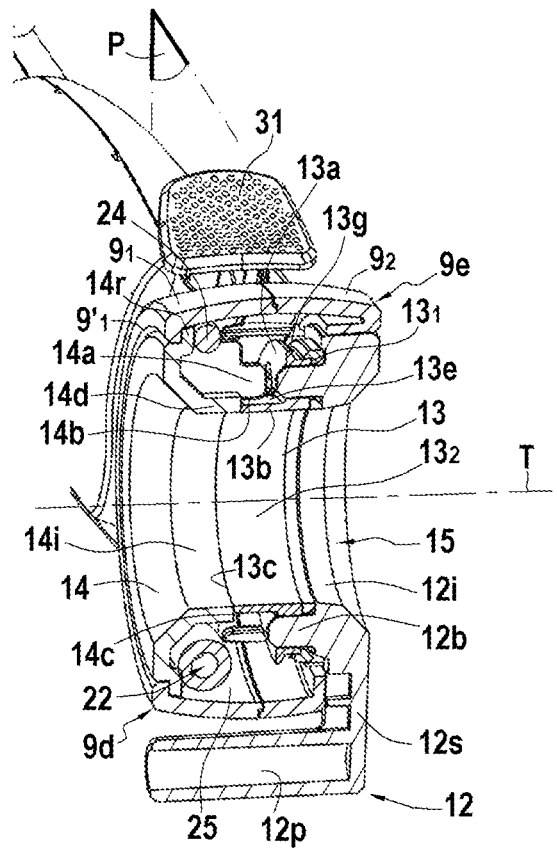

[Fig.5]
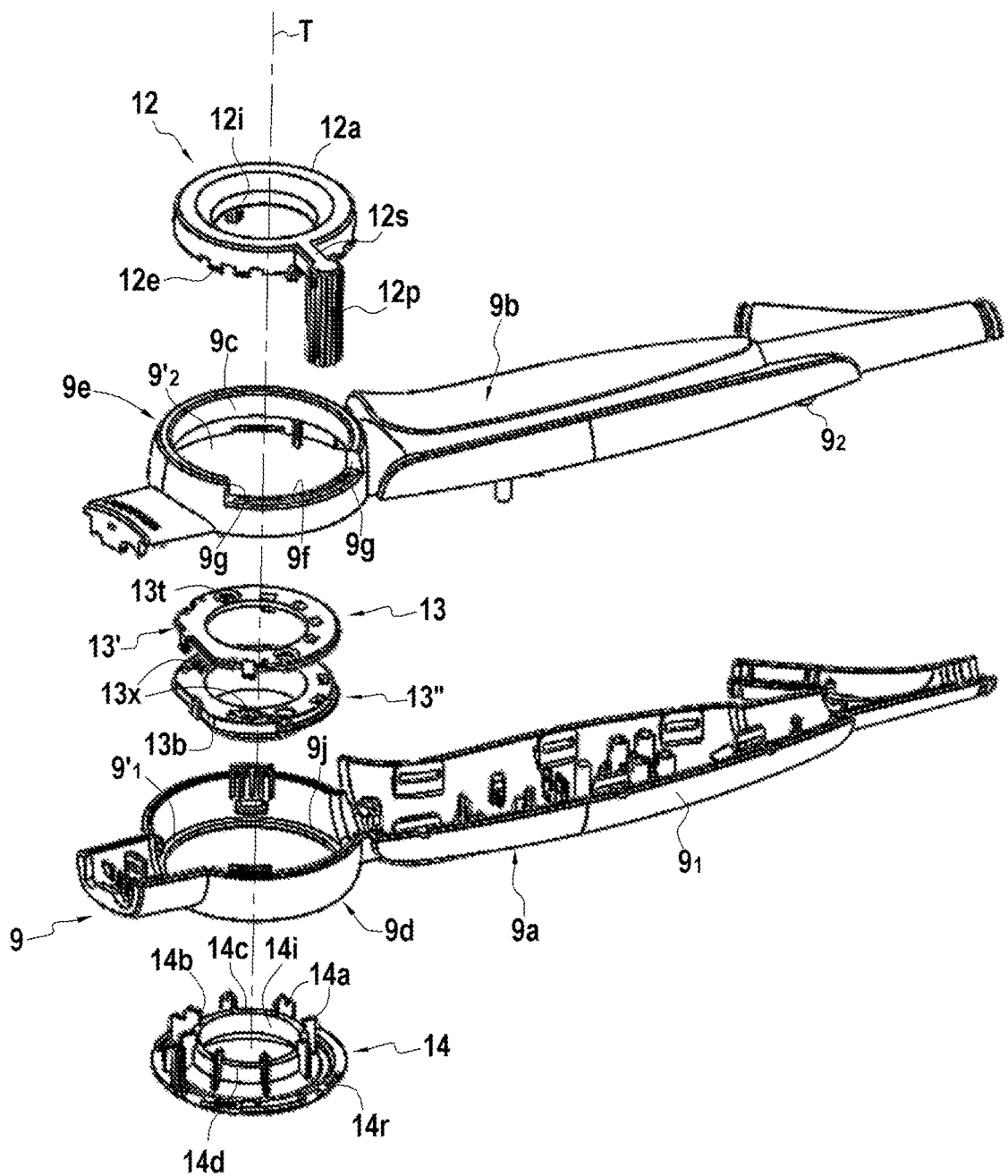

[Fig.6]
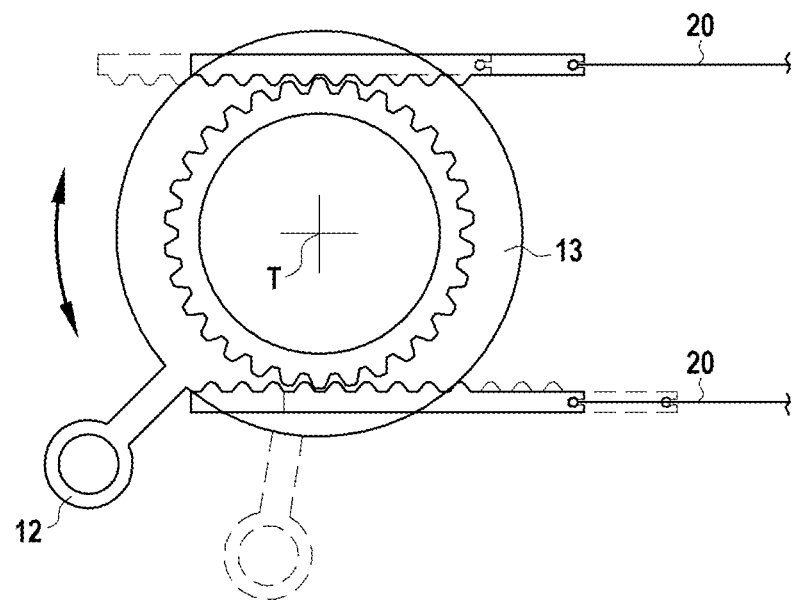
[Fig.7]
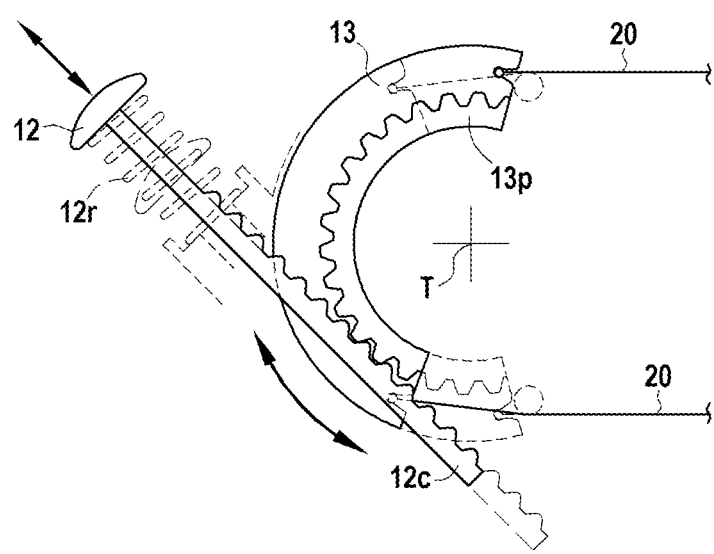

HANDLE WITH A MECHANISM FOR CONTROLLING THE BENDING OF THE HEAD OF A MEDICAL ENDOSCOPE

TECHNICAL FIELD

The present disclosure relates to the technical field of medical endoscopes in a general sense for accessing the interior of a hollow organ, a cavity or a natural or artificial conduit of the human body with a view to performing various operations for therapeutic, surgical or diagnostic purposes.

The present disclosure relates more specifically to the control handle of such endoscopes, adapted to remain outside the hollow organ, the cavity or the conduit to be inspected and equipped particularly with a mechanism for controlling the bending of the head of a medical endoscope.

The endoscope according to the disclosure is used for diagnostic, therapeutic or surgical purposes for the inspection of all inner parts of the human body accessible by the natural or artificial paths. For example, the endoscope according to the disclosure can be used in the field of urinary tract, gastrointestinal tract, respiratory system, cardiovascular system, trachea, sinus cavity, women's reproductive system, abdominal cavity or any other part of the human body to be explored by a natural or artificial path.

BACKGROUND

In general, an endoscope includes a control handle in the form of a casing adapted to be held by a user of the endoscope and to which a tubular structure designed to be inserted into a body cavity of a patient to be examined, is fixed. This tubular insertion structure includes a distal head equipped with a vision system that allows illuminating and examining the organ, the cavity or the conduit of the human body. Upstream of the distal head, the tubular insertion structure includes a deflection part controlled by a mechanism of the control handle to orient the distal head inside the insertion path.

The state of the art has proposed many solutions to achieve the mechanism that allows controlling the bending of the distal head of the tubular insertion structure. For example, U.S. Pat. No. 6,017,322 describes a control mechanism including a rotary knob acting on a pulley on which are fixed the ends of two cables whose other ends are fixed to the distal head of the tubular insertion structure.

Another example of a simple mechanism is described in patent EP 1 804 639 including a pair of control wires connected to a transmission structure comprising a plurality of bodies connected to each other by links so as to slide together. This mechanism is controlled by a rotary knob extending outside the handle.

In document WO 2010/066789, the handle includes a lever that can be moved along a curved path and connected to a lever that can pivot about a pivot axis and that acts on two control wires to ensure the bending of the distal head.

Patent application US 2013/324973 describes a handle for a catheter including a casing formed of two half-shells delimiting a housing for an annular actuation mechanism for cables causing the bending of the distal head. The annular actuation mechanism includes a base element and a cover assembled together and delimiting internally a retaining and sliding channel for the terminal parts of the cables. The internal face of a half-shell is provided with a tubular shank around which the actuation mechanism rotates. This actuation mechanism is provided with two diametrically opposite buttons, protruding from the casing to be accessible by the operator. A tension system bears on a half-shell while a screw is engaged through the other half-shell and in the tubular shank to cooperate with the tension system. The clamping of the tension system allows setting the compressive force applied by the half-shells on the annular actuation mechanism and, consequently, adjusting the rotatability of this actuation mechanism.

Patent application WO 2011/089349 describes an endoscope including a system for actuating the distal head of the insertion tube including pulleys mounted coaxially in the casing of the control handle. These pulleys are driven in rotation by rotary control levers extending laterally and on the back of the handle.

Whatever the embodiment of the control mechanism, it must be considered that the actuation of the control button is a delicate operation to be carried out by the operator given the fact that the operator must firmly hold the control handle during the inspection operation. In many solutions, the user has difficulty in exerting, on the control button, a force adapted to ensure the bending of the distal head while maintaining the handle. An additional difficulty arises when the user must furthermore act on the obturation device of a fluid circulation circuit to bring fluids or to aspirate fluids at the distal head.

SUMMARY

The present disclosure therefore aims to overcome the drawbacks of the state of the art by proposing a new control handle for a medical endoscope, designed to facilitate the control operations aimed at ensuring the bending of the distal head.

To achieve such an objective, the handle for a medical endoscope includes a casing having two opposite main faces and provided with a mechanism for controlling the bending of a distal head of the medical endoscope, this control mechanism including at least one member for actuating a pivoting part made in the form of an actuation ring having an axial ferrule having a cylindrical outer surface cooperating with an annular bearing to be guided in rotation by this annular bearing, along a transverse axis of rotation and whose rotation causes the bending of the distal head, the axial ferrule having an internal bore partly delimiting a cylindrical opening configured for the insertion of a finger and which passes right through the casing by opening out through internal bores on the two opposite main faces of the casing, the pivoting part and the annular bearing being arranged to be located outside the cylindrical opening.

According to one embodiment characteristic, the cylindrical opening has a passage section comprised between 8×8 mm and 30×30 mm and preferably between 8×8 mm and 25×25 mm.

Typically, the pivoting part is guided in displacement by a pivot connection about a transverse axis of rotation coincident with the transverse axis of the cylindrical opening, the pivoting part being blocked in translation on one side, by the annular bearing mounted secured to a first half-shell of the casing and on the other side, by a second half-shell of the casing.

Advantageously, the axial ferrule of the actuation ring has at its free end, a bearing edge cooperating with an abutment edge of a neck of the annular bearing to form together an empty cylinder internally delimiting the cylindrical opening.

According to one exemplary embodiment, the actuation member forms part of an annular collar fixed on the pivoting part and having an internal bore of section identical to the internal bore of the axial ferrule to form, with the axial ferrule and the neck of the bearing, an empty cylinder internally delimiting the cylindrical opening.

For example, the first half-shell and the second half-shell of the casing are fixed together.

Furthermore, the pivoting part is blocked transversely in one direction by an abutment edge of the annular bearing arranged or fixed on the first half-shell and in the other direction by abutting on the second half-shell of the casing.

According to one alternative embodiment, the actuation member is a lever mounted secured to the pivoting part guided in rotation so as to move in rotation the pivoting part by a rotational movement of the lever.

Advantageously, the lever includes an actuation arm extending parallel to the transverse axis of rotation and externally to the casing, between the two main faces of the casing.

Preferably, the actuation member forms part of an annular collar delimited by a bore mounted secured to the pivoting part by abutting on the second half-shell of the casing.

According to another alternative embodiment, the actuation member is guided in linear displacement and acts on the pivoting part by means of a system for transforming the linear movement of the control member into a rotational movement of the pivoting part.

Conventionally, at least one control cable for the bending of the distal head is mounted inside the control handle, the pivoting part acting directly or by a movement transformation system, on at least said control cable for the bending of the distal head.

According to one advantageous embodiment characteristic, the casing includes a first housing for a fluid circulation circuit and a second housing for an electric cable, part of these housings passing on either side of the cylindrical opening, these housings opening out at a proximal part of the casing.

Another object of the disclosure is to propose a medical endoscope including a tubular insertion structure supported by a handle in accordance with the disclosure.

Various other characteristics emerge from the description given below with reference to the appended drawings which show, by way of non-limiting examples, embodiments of the object of the disclosure.

BRIEF DESCRIPTION OF THE DRAWINGS

FIG. 1 is a perspective view of a medical endoscope in accordance with the disclosure.

FIG. 2 is a perspective view of one exemplary embodiment of a control handle in accordance with the disclosure, from which part of the casing is removed.

FIG. 3 is a perspective view of the control handle illustrated in FIG. 2, from which part is removed to show one characteristic of the object of the disclosure.

FIG. 4 is a cross-sectional view showing characteristic details of the handle in accordance with the disclosure.

FIG. 5 is an exploded perspective view illustrating the control handle in accordance with the disclosure.

FIG. 6 is a diagram showing another exemplary embodiment of the mechanism for controlling the bending of the distal head of the endoscope.

FIG. 7 is a diagram showing another exemplary embodiment of the mechanism for controlling the bending of the distal head of the endoscope, using a linear actuation member.

DETAILED DESCRIPTION

As shown more specifically in FIGS. 1 to 5, the object of the disclosure relates to a medical endoscope 1 including an actuation support 2 such as a control handle equipped with a consumable medical instrument 3. This consumable medical instrument 3 which is in contact with the tissues or the human organs is essentially for single or multiple use for a patient or is even reusable after decontamination, disinfection and even sterilization.

The consumable medical instrument 3 is assembled to the handle 2 permanently or temporarily using an assembly system 4. For example, the assembly system 4 ensures a complete connection between the handle 2 and the consumable medical instrument 3 or is of the snap-fit type to quickly ensure an at least temporary mechanical connection while offering the advantage of allowing easy separation of the consumable medical instrument 3 from the handle 2.

Conventionally, the consumable medical instrument 3 includes an outer insertion tube 5 having a more or less significant length and flexibility and intended to be introduced into a natural or artificial access path with a view to performing various operations or functions for therapeutic, surgical or diagnostic purposes. For example, the insertion tube 5 has a distal part 7 forming the head of the endoscope 1. The insertion tube 5 also includes a proximal part 8 opposite to the distal part 7 and protruding from the distal end 9$i$ of a casing 9 forming the main body of the handle 2.

This casing 9 is in the form of an elongated body arranged to provide easy gripping of the endoscope. In the illustrated exemplary embodiment, the casing 9 includes a first half-shell $9_1$ and a second half-shell $9_2$ of complementary shape to the first half-shell $9_1$ so as to be able to be assembled or fixed together by any fixing systems such as by snap-fitting for example (FIG. 5). The first half-shell $9_1$ and the second half-shell $9_2$ have C-shaped straight sections. This casing 9 thus has, on one side of a median longitudinal plane P, a first main face 9$a$, and on the opposite side of this plane, a second main face 9$b$. These two opposite main faces 9$a$, 9$b$ are connected by a peripheral area 9$p$.

The handle 2 includes a mechanism 11 for controlling the bending of the distal head 7 of the insertion tube 5 that allows orienting the distal head 7 with respect to the longitudinal axis of the insertion tube 5. For this purpose, the insertion tube 5 includes, upstream of the distal head 7, a bending, folding or deflection part 5$a$ allowing the orientation of the distal head 7 with respect to the longitudinal axis of the insertion tube 5. This bending, folding or deflection part 5$a$ can be made in any appropriate manner to ensure the bending of the distal head 7 with respect to the longitudinal axis of the insertion tube 5. For example, this bending, folding or deflection part 6 can be made by a spring or by tubular vertebrae hinged together.

In accordance with the disclosure, the control mechanism 11 includes at least one actuation member 12 which, following the application of a manual force, causes the bending of the distal head 7. According to the exemplary embodiment illustrated in FIGS. 1 to 5, the actuation member 12 is a lever guided in rotation over a limited angular range, along a transverse axis of rotation T. According to the example illustrated in FIG. 7, the actuation member 12 is a pusher guided in linear displacement and urged by elastic return.

The actuation member 12 acts on a pivoting part 13 so as to drive, directly or indirectly, its rotation about the transverse axis of rotation T. This pivoting part 13 is connected to the distal head 7 so that a rotation of the pivoting part 13 causes the bending of the distal head 7. This pivoting part 13 is guided in rotation by an annular-shaped bearing 14.

According to an aspect of the disclosure, the pivoting part 13 and the annular bearing 14 are arranged to be located outside an opening or a cylindrical hole 15 which passes right through the casing 9 to open out onto the two opposite main faces 9 a, 9 b of the casing. As is clearly shown in the Figures, the cylindrical opening 15 completely passes through the casing 9 by opening on the two opposite main faces 9 a, 9 b of the casing and corresponding to an empty space. The cylindrical opening 15 thus passes through the annular bearing 14, the pivoting part 13, the first half-shell 9 1 and the second half-shell 9 2. As will be explained later in the following description, the operator can thus insert a finger therein to facilitate the operations of gripping and/or maneuvering the endoscope. Typically, the cylindrical opening 15 has a circular section with a diameter comprised between 10 and 40 mm, or an area of approximately 78 mm² to 1257 mm², and preferably a diameter between 10 mm and 25 mm, or an area of approximately 78 mm² to 491 mm², to allow in particular the insertion of a finger of an operator or of a hook to suspend the medical endoscope 1. In the case where the cylindrical opening 15 is not of circular section, the cylindrical opening 15 has a passage section comprised between 8 mm×8 mm and 30 mm×30 mm, or an area of approximately 64 mm² to 900 mm², and preferably between 8 mm×8 mm and 25 mm×25 mm, or an area of approximately 64 mm² to 625 mm².

The cylindrical opening 15 includes a transverse axis which is advantageously coincident with the transverse axis of rotation T of the pivoting part 13. In the example illustrated, the cylindrical opening 15 has a circular section but it is clear that the section of the cylindrical opening 15 can be of different shape.

According to one exemplary embodiment illustrated in FIGS. 1 to 5, the lever 12 directly drives in rotation the pivoting part 13 about the transverse axis of rotation T. According to this example, the lever 12 forms part of an annular collar 12a delimited by an internal bore $12_i$, intended to be fixed by all appropriate means on the pivoting part 13. For example, the annular collar 12a includes lugs 12b adapted to be engaged in holes 13t arranged in the pivoting part 13. Of course, the lever 12 can form an integral part of the pivoting part 13, as in the alternative embodiment illustrated in FIG. 6 in which the pivoting part 13 is a ring provided radially with an arm forming a rotatably actuation lever 12.

According to another exemplary embodiment illustrated in FIG. 7, the actuation member 12 can indirectly cause the rotation of the pivoting part 13 about the transverse axis of rotation T. According to this example, the actuation member 12 which is a pusher movable in translation and returned in position by a spring 12r, acts on the pivoting part 13 via a system for transforming the linear movement of the pusher into a rotational movement of the pivoting part 13. This transformation system includes a pinion 13p and a rack 12c fixed respectively to the pivoting part 13 and to the actuation member 12. It should be considered that, for example, the actuation member 12 forms part of an annular collar 12a mounted around the pivoting part 13 and delimited by an internal bore 12i partly delimiting the cylindrical opening 15 which passes right through the casing.

According to one advantageous embodiment characteristic, the pivoting part 13 is guided by a pivot connection so as to present only one rotational movement about the transverse axis of rotation T. The pivoting part 13 can be made in different manners by considering that the rotational movement of the pivoting part is generally limited to an angular amplitude of less than one turn and particularly, less than one third of a turn. According to the exemplary embodiment illustrated in FIGS. 1 to 5, the pivoting part 13 is made in the form of a ring including a complete or closed annulus 13a. Of course, the pivoting part 13 can be made in a different manner, such as in the form of a semi-ring or an annulus portion in particular, as illustrated according to the alternative embodiment of FIG. 7 for example.

This ring 13 is guided in rotation by an axial ferrule 13b cooperating with the annular bearing 14. This axial ferrule 13b protrudes axially with respect to the annulus 13a of the ring while being centered along the transverse axis of rotation T. The axial ferrule 13b has a cylindrical external surface 13e cooperating with the annular bearing 14 to ensure the rotational guidance of the ring.

To this end, the annular bearing 14 has an annular guidance formed by a series of axial ribs 14a each having an axial internal edge 14b. These radial internal edges 14b are distributed on a circle centered along the transverse axis of rotation T in order to cooperate with the cylindrical external surface 13e of the axial ferrule.

The annulus 13a of the ring 13 is delimited at its periphery by an external edge $13_1$ and in its central part by an internal bore $13_2$. It should be noted that the internal bore $13_2$ delimits the internal surface of the axial ferrule 13b, which is coaxial with the cylindrical outer surface 13e. It follows that the ring 13 includes an internal bore $13_2$ forming part of the cylindrical opening 15 which passes right through the casing. The pivoting part 13 is thus guided externally by the interior of the annular bearing 14 that allows delimiting an internal bore $13_2$ with a large diameter and corresponding to an empty space.

According to one advantageous embodiment characteristic, the axial ferrule 13b of the ring 13 has at its free end, a bearing edge 13c cooperating with an abutment edge 14c of the annular bearing 14. As shown more specifically in FIG. 4, the annular bearing 14 thus includes a cylindrical neck 14d extending axially while being centered along the transverse axis of rotation T and ending, at its free end, with the abutment edge 14c. It should be noted that the ribs 4a are carried by the cylindrical external surface of the neck 14d. This neck 14d has an internal bore 14i. Thus, the annular bearing 14 thus delimits by its internal bore 14i, a part of the cylindrical opening 15 which passes right through the casing 9.

Advantageously, the ring 13 presents an internal bore $13_2$ of section identical to the internal bore $14_1$ of the annular bearing 14. It follows that the ring 13 and the annular bearing 14 which are juxtaposed by forming the extension of each other, together delimit the cylindrical opening 15 which opens out into the first half-shell $9_1$ and into the second half-shell $9_2$. Thus, the axial ferrule 13b of the actuation ring cooperates by its bearing edge 13c, with the abutment edge 14c of the cylindrical neck 14d of the annular bearing to form together an empty cylinder internally delimiting the cylindrical opening 15.

In the illustrated exemplary embodiment, the lever 12 is added by an annular collar 12a fixed on the ring 13. As shown in FIG. 4, the internal bore 12i of the annular collar 12a has a section identical to the internal bore $13_2$ of the ring 13 so that the ring 13, the annular bearing 14 and the annular collar 12a together delimit the cylindrical opening 15 which passes right through the casing. The annular collar 12a bears on or forms, through its internal part delimiting the internal bore 12i, the extension of the axial ferrule 13b, on the opposite side to the bearing edge 13c. It follows that the annular collar 12a delimits by the internal bore 12i with the axial ferrule 13b of the ring 13 and the neck 14d of the bearing, an empty cylinder internally delimiting the cylindrical opening 15.

According to the exemplary embodiment illustrated in the drawings, the annular bearing 14 is fixed on a main face of the casing and more specifically to the first half-shell $9_1$ of the casing. To this end, the annular bearing 14 is in the form of an annular trim added and fixed by any appropriate means on a half-shell of the casing, for example the first half-shell $9_1$. For example, the first half-shell $9_1$ has a mounting hole $9'_1$ for the trim 14 which includes, for example, at its periphery, radial lugs 14r blocked axially by tabs 9j arranged on the inner face of the first half-shell $9_1$ at the periphery of the mounting hole $9'_1$. For example, the first half-shell $9_1$ is arranged to have a snare or a circular collar 9d forming a protrusion or a boss and extending axially while being centered on the transverse axis of rotation T and delimiting the mounting hole $9'_1$ of circular section. The annular bearing 14 is therefore mounted inside the mounting hole $9'_1$ of the first half-shell $9_1$ and delimited by the snare or the circular collar 9d.

According to one exemplary embodiment not illustrated in the drawings, the annular bearing 14 can be arranged directly on the first half-shell $9_1$. According to this example, the first half-shell has on its inner face all the characteristics of the annular bearing 14 described above.

It should be noted that the ring 13 is blocked in translation, by the abutment edge 14c of the annular bearing 14 which is secured to the first half-shell $9_1$, along a direction of the transverse axis of rotation T, namely the one directed towards the first half-shell $9_1$ in the example considered. The ring 13 is also blocked in translation along the other direction of the transverse axis of rotation T, namely the one directed towards the second half-shell $9_2$ in the considered example. Thus, the ring 13 is abutting on the second main face 9b of the casing while preserving its freedom of rotation with respect to the casing.

In the illustrated exemplary embodiment, the ring 13 is abutting on the second main face of the casing and more specifically on the second half-shell $9_2$, via the annular collar 12a of the actuation member, fixed to the ring 13. According to this example, the annular collar 12a includes lugs 12e distributed at its periphery to bear against a rim 9c of a hole $9'_2$ arranged in the second half-shell $9_2$. For example, the second half-shell $9_2$ is arranged to have a snare or a circular collar 9e forming a protrusion or a boss and extending axially while being centered on the transverse axis of rotation T and delimiting the mounting hole $9'_2$ of circular section. The annular collar 12a is therefore mounted inside the mounting hole $9'_2$ arranged in the second half-shell $9_2$ and delimited by the snare or the circular collar 9e.

It appears from the drawings that the snare or the circular collar 9d arranged in the first half-shell $9_1$ and the snare or the circular collar 9e arranged in the second half-shell $9_2$ together form a transverse tubular shank 9d, 9e through which the cylindrical opening 15 passes. The casing 9 thus has at its proximal part, the transverse shank 9d, 9e which is extended in the direction of the distal end 9d of the casing 9, by an elongated body. The transverse shank 9d, 9e of the casing 9 is extended in the opposite direction of the distal end 9i, by a proximal nose 9n delimiting the proximal end 9k of the casing.

According to one advantageous alternative embodiment, the actuation member 12 and particularly the bearing arm 12p has a non-slip surface, made for example by the material constituting the bearing arm 12p (rubber for example) or by a textured surface (by knurling for example). This non-slip surface guarantees good grip with the thumb during the deflection phase during the examination despite the practitioner's gloves or the fluids that can make the bearing arm slippery.

According to another advantageous embodiment characteristic, the actuation lever 12 includes a bearing arm 12p extending parallel to the transverse axis of rotation T and externally to the casing, between the two main faces of the casing. For this purpose, the annular collar 12a of the actuation member is provided with a radial segment 12s at the end of which the bearing arm 12p which is positioned in the vicinity of the peripheral area 9p of the casing extends perpendicularly. As shown in the drawings, the bearing arm 12p which has a displacement according to an arc of a circle, is able to move opposite part of the snares or circular collars 9e, 9d of the casing.

Advantageously, the snare or the circular collar 9e of the second half-shell $9_2$ is provided with a notch 9f delimited on either side by shoulders 9g and in which the radial segment 12s of the actuation lever 12 takes place. The shoulders 9g thus constitute end-of-travel abutments for the actuation lever 12. This notch 9f is arranged on a limited portion of the snare or of the circular collar 9e, for example on the order of 45°, while being located in the lower part of the casing when the handle is in the position of use.

The pivoting part 13 acts directly or by a transformation mechanism, on at least one, and in the example illustrated, two control cables 20 to ensure the bending of the distal head 7. In the exemplary embodiment illustrated in FIGS. 2 to 5, the ends of the cables 20 are fixed to the pivoting part 13 in any appropriate manner so that a rotation of the pivoting part 13 causes the bending of the distal head 7. Advantageously, each cable 20 passes in a recess 13g arranged in the external edge $13_1$ of the ring 13. The pivoting part 13 thus forms a pivoting annular pulley ensuring, for example, the left-right or bottom-top displacement of the head 7. Of course, the cables 20 are made in any suitable manner to ensure this bending function. Thus, these cables 20 can be mounted in a sheath and be made by rods, wires or chains, made of a metal or polymer material for example.

The actuation cables 20 are mounted inside the control handle 2 by leaving it through the distal end 9i to enter inside the insertion tube 5 and be fixed by their distal ends to the distal part 7 of the insertion tube. The proximal ends of the actuation cables 20 are fixed to the pivoting part 13 in any suitable manner. In the example illustrated, the pivoting part 13 is made by two parts assembled together, namely a male annular flange 13' provided with assembly studs and a female annular flange 13" provided with housings for receiving the studs of the male annular flange. At least one of the annular flanges 13', 13" is arranged to include two housings 13x adapted to each receive a sleeve crimped on the end of a cable 20. These housings 13x which are closed during the assembly of the two annular flanges 13', 13" ensure the anchoring of the cables 20 to the pivoting part 13.

It is apparent from the foregoing description that the handle in accordance with the disclosure has optimized handling ergonomics thanks to the cylindrical opening 15 which corresponds to an empty space passing right through the casing of the handle. This cylindrical opening 15 particularly authorizes good gripping of the handle while providing a facility to maneuver the actuation member 12 which is located in the vicinity of the cylindrical opening 15. This cylindrical opening 15 also offers a possibility of hooking of the handle to a hook of any type known per se.

It should also be noted that this handle 2 has a longitudinal symmetry allowing ambidextrous grip. Likewise, the actuation of the actuation member 12 can be performed just as easily with the left hand as with the right hand.

Furthermore, this handle 1 offers good resistance to crushing by the cooperation with the transverse tubular shank 9*d*, 9*e* of the half-shells, of the pivoting part 13 and of the annular bearing 14. However, it should be noted that this handle has a reduced weight taking into account the presence of the cylindrical opening 15 that allows reducing the mass of the material constituting the half-shells of the casing.

Furthermore, it should be noted that the actuation lever 12 is easily mounted on the pivoting part 13 which is guided in rotation over a large angular range that allows obtaining accuracy for the rotation of the pivoting part 13.

In the description above, the handle 1 includes a control mechanism 11 for deflecting the distal head 7 along one direction, but it is clear that the handle can include two control mechanisms 11 for deflecting the distal head 7 in two perpendicular directions.

According to an aspect of the disclosure, the handle 1 includes a fluid circulation circuit 22 adapted to supply fluid to the distal head 7 or to aspirate fluids from the distal head 7. This fluid circulation circuit 22 is mounted inside the casing, between the proximal end 9*k* and the distal end 9*i* to extend inside the insertion tube 5 up to the distal head 7. Similarly, the handle 2 is able to illuminate and bring back an image of the distal part 7 of the insertion tube 5. For this purpose, an electric cable 24 is mounted inside the casing, between the proximal end and the distal end to extend inside the insertion tube 5 up to the distal head 7.

According to an aspect of the disclosure, the casing 9 is arranged to allow the positioning of the fluid circulation circuit 22 on one side of the cylindrical opening 15 and the positioning of the electric cable 24 on the other side of the cylindrical opening 15. For this purpose, the casing 9 and particularly, the first half-shell 9₁ at the snare or the circular collar 9*e*, is arranged so as to delimit on one side of the mounting hole 9'₁, a first housing 25 for the passage of the fluid circulation circuit 20 and on the other side of the mounting hole 9'₁, a second housing 26 for the electric cable 24. These housings 25, 26 which each have the shape of a half-crown meet in the elongated part of the casing in which the fluid circulation circuit 20 and the electric cable 24 are mounted. The fluid circulation circuit 20 and the electrical cable 24 pass through the distal end 9*i* of the casing to be inserted into the insertion tube 5. These housings 25, 26 also meet on the opposite side to open out into the proximal nose 9*n* of the casing and allow the mounting, outside the casing, of a connector 24*r* on the electrical cable 24 and of a connector 20*r* on the fluid circulation circuit 20 for its connection to a source of aspiration or supply of a fluid.

It appears from the preceding description that the masses inside the handle 2 are well balanced insofar as in particular the outlets of the fluid circulation circuit 20 and of the electric cable 24 are located at the proximal end 9*k* of the casing, that is to say opposite to the distal end 9*i* of the casing through which the fluid circulation circuit 20 and the electric cable 24 emerge. The fluid circulation circuit 20 and the electric cable 24 are thus mounted inside the casing 9 from one end 9*k* to the other end 9*i*, passing right through the cylindrical opening 15. The positioning of these outlets at the proximal end 9*k* of the casing offers good gripping quality of the handle.

Conventionally, the fluid circulation circuit 20 is provided with an obturator 30 monitoring the opening and the closing of the circuit 20 using a control button 31 movable in translation and protruding from the casing. Advantageously, the casing 9 is arranged to have an orifice 9*t* bordering the transverse tubular shank 9*d*, 9*e* of the half-shells such that the control button 31 extends tangentially to this tubular transverse shank 9*d*, 9*e* of the half-shells, in the upper part of the casing when the handle is in the position of use. Thus, this control button 31 can be easily actuated by the hand also moving the lever 12 for the bending of the distal head 7.

The disclosure is not limited to the examples described and represented because various modifications can be made thereto without departing from its scope.

The invention claimed is:

1. A handle for a medical endoscope including a casing having two opposite main faces and provided with a mechanism for controlling the bending of a distal head of the medical endoscope, the mechanism including;
   at least one member for actuating a pivoting part, the pivoting part being made in the form of an actuation ring;
   the actuation ring having an axial ferrule;
   the axial ferrule having a cylindrical outer surface cooperating with an annular bearing to be guided in rotation by the annular bearing along a transverse axis of rotation and whose rotation causes the bending of the distal head;
   the axial ferrule having an internal bore partly delimiting a cylindrical opening which passes right through the casing by opening out through internal bores on the two opposite main faces of the casing; and
   the pivoting part and the annular bearing being arranged to be located outside the cylindrical opening, the annular bearing having a full circle-shaped section,
   wherein the cylindrical opening has a passage section with an area comprised between 64 mm² and 900 mm².

2. The handle of claim 1, wherein the cylindrical opening has a passage section with an area comprised between 64 mm² and 625 mm².

3. The handle of claim 1, wherein the pivoting part pivots about the transverse axis of rotation coincident with a transverse axis of the cylindrical opening, the pivoting part being blocked in translation on a first side, by the annular bearing mounted secured to a first half-shell of the casing and on a second side, by a second half-shell of the casing.

4. The handle of claim 3, wherein the axial ferrule has a bearing edge cooperating with an abutment edge of a neck of the annular bearing to form together an empty cylinder internally delimiting the cylindrical opening.

5. The handle of claim 4, wherein the member for actuating the pivoting part forms a part of an annular collar fixed on the pivoting part and having an internal bore of a section identical to the internal bore of the axial ferrule to form, with the axial ferrule and the neck of the annular bearing, the empty cylinder internally delimiting the cylindrical opening.

6. The handle of claim 3, wherein the first half-shell and the second half-shell of the casing are fixed together.

7. The handle of claim 6, wherein the pivoting part is blocked transversely in one direction by an abutment edge of the annular bearing arranged or fixed on the first half-shell and in another direction by abutting on the second half-shell of the casing.

8. The handle of claim 1, wherein the member for actuating the pivoting part is a lever mounted secured to the pivoting part guided in rotation to move in rotation the pivoting part by a rotational movement of the lever.

9. The handle of claim 8, wherein the lever includes an actuation arm extending parallel to the transverse axis of rotation and externally to the casing, between the two opposite main faces of the casing.

10. The handle of claim 3, wherein the member for actuating the pivoting part forms part of an annular collar mounted secured to the pivoting part by abutting on the second half-shell of the casing.

11. The handle of claim 1, wherein the member for actuating the pivoting part is guided in linear displacement and acts on the pivoting part by means of a system for transforming the linear movement of the member into a rotational movement of the pivoting part.

12. The handle of claim 1, wherein at least one control cable for the bending of the distal head is mounted inside the handle, the pivoting part acting directly or by a movement transformation system, on at least said control cable for the bending of the distal head.

13. The handle of claim 1, wherein the casing includes a first housing for a fluid circulation circuit and a second housing for an electric cable, a part of the first housing or the second housings passing on either side of the cylindrical opening, these housings opening out at a proximal part of the casing.

14. A medical endoscope including a tubular insertion structure supported by a handle according to claim 1.

\* \* \* \* \*